United States Patent [19]

Endoh et al.

[11] Patent Number: 4,916,685
[45] Date of Patent: Apr. 10, 1990

[54] DETERMINATION OF THE TOTAL TIME REQUIRED FOR REPRODUCING A DESIRED RANGE OF SIGNALS RECORDED ON A RECORDING DISK IN A SIGNAL RECORDING AND REPRODUCTION SYSTEM

[75] Inventors: Satoshi Endoh, Katano; Syoichi Henmi, Hirakata; Ryuichi Kusaba, Suita; Katsunori Koukata, Sendai; Noriyuki Sakamoto, Hirakata, all of Japan

[73] Assignee: Matsushita Electric Industrial Co., Ltd., Osaka, Japan

[21] Appl. No.: 239,305

[22] Filed: Sep. 1, 1988

[30] Foreign Application Priority Data

Sep. 4, 1987 [JP] Japan ................................ 62-222328
Sep. 4, 1987 [JP] Japan ................................ 62-222329

[51] Int. Cl.$^4$ .......................... G11B 15/52; G11B 3/90
[52] U.S. Cl. ........................................ 369/47; 369/56
[58] Field of Search ....................... 369/47, 53, 54, 56, 369/83, 84

[56] References Cited

U.S. PATENT DOCUMENTS 4,746,993  5/1988  Tada ........................................ 369/53
4,817,075  3/1989  Kikuchi et al. ...................... 369/47

FOREIGN PATENT DOCUMENTS 59-119343  12/1985  Japan ................................ 369/83
6187074   10/1987  Japan ................................ 369/84
61-229663  4/1988  Japan ................................ 369/84

Primary Examiner—Vincent P. Canney
Attorney, Agent, or Firm—Spencer & Frank

[57] ABSTRACT

A signal recording and reproduction system is used in recording and reproducing signals on and from a recording medium such as a compact disk, laser disk, video disk or digital audio tape. Index data for the recorded contents such as Table of Contents data (TOC) or the like, are stored in the recording medium. The signal recording and reproduction system confirms the time necessary for playing or reproducing a desired reproduction range of record sections in the recording medium, using a small number of steps of operation.

3 Claims, 7 Drawing Sheets

FIG. 8A

| | 1 | 2 | 3 | 4 | 5 | 6 |
|---|---|---|---|---|---|---|
0 T1  T2  T3  T4  T5  T6  T

FIG. 8B

EXAMPLE OF TOC DATA

| TYPE | RECORDED DATA |
|---|---|
| TOTAL NUMBER OF MUSIC PIECES TO BE PLAYED | N = 6 |
| TOTAL PLAY TIME | T = 30'02" |
| START POINT OF 1ST MUSIC PIECE | T1 = 0'02" |
| START POINT OF 2ND MUSIC PIECE | T2 = 5'02" |
| START POINT OF 3RD MUSIC PIECE | T3 = 10'02" |
| START POINT OF 4TH MUSIC PIECE | T4 = 15'02" |
| START POINT OF 5TH MUSIC PIECE | T5 = 20'02" |
| START POINT OF 6TH MUSIC PIECE | T6 = 25'02" |

DETERMINATION OF THE TOTAL TIME REQUIRED FOR REPRODUCING A DESIRED RANGE OF SIGNALS RECORDED ON A RECORDING DISK IN A SIGNAL RECORDING AND REPRODUCTION SYSTEM

BACKGROUND OF THE INVENTION

The present invention relates to a signal recording and reproduction system in which the time necessary for reproduction or playback of the desired playback section can be confirmed before the recording medium, which stores index data for the recorded contents, is played. The index data is called the TOC (Table of Contents) or the like. The recording medium may be an audio recording medium such as a compact disk or a digital audio recording medium (DAT), or a video recording medium such as a laser disk or video disk.

In the prior art, recording media of the digital recording type, including compact disks, have data known as subcode recorded together with the audio signal data. The subcode contains a time code indicating the total time length (in minutes and seconds or the number of frames covered) from the beginning of the recording medium. The subcode also contains the TOC or index data indicating the contents of the recorded data, including the total number of pieces of music recorded (or the number of music contents recorded), the time necessary for playing the whole program of music, and position data indicative of the start position of a given piece of music in the form of minutes and seconds and the number of frames as counted from the beginning of the particular recording medium. In the prior art, the function of indicating the remaining time is realized by the time code and TOC data contained in the subcode, and the function of indicating the time which is required for playing the whole program is realized by the TOC data.

FIGS. 8A and 8B show an example of the record contents of a recording medium and an example of the TOC data associated therewith. In these diagrams, numerals 1 to 6 designate the selection numbers or music numbers of the selections or pieces of music that are recorded. In this case, a total of six pieces of music are recorded. The start points $T_1$ to $T_6$ of the respective pieces of music 1 to 6 indicate the length of time from the origin 0 (00'00") of the recording medium. These time data are recorded as TOC data in the form of values as shown in FIG. 8B. The other TOC data recorded include the data N indicative of the total number of pieces of music to be played and the total play time T.

In a conventional system as shown in FIG. 9, the remaining time from the play position to the last point of the recording medium is indicated. That is, the information recorded in the recording medium 31 is reproduced by a reproduction means 32, which is operated by an operation means 33. The TOC data is stored in TOC data memory means 35 of a microcomputer 34, and the time code is detected by time code detection means 36. Also, the total play time T included in the TOC data stored in the TOC data memory means 35 is indicated by total play time indication means 37 (such as a liquid crystal indicator). Numeral 38 designates a remaining time calculation means, in which the constantly changing time t produced from time code detection means 36 is subtracted from the total play time T of the TOC data memory means 35 to thereby calculate the remaining time $T_X$ ($=T-t$). This remaining time $T_X$ is indicated by remaining time indication means 39.

The relationship between the remaining time $T_X$ and the time t is shown in FIG. 10 in association with the recording medium shown in FIG. 8. The remaining time $T_X$ changes as the recording medium is driven, regardless of the start points $T_1$ to $T_6$ of the pieces of music 1 to 6 or midway thereof.

The remaining time is conveniently known in the conventional systems mentioned above. However, in the case where it is desired to know the play time for a desired reproduction section range covering intermediate pieces of music, for example, from the third piece of music to the end of the fifth piece of music, the procedure described below had to be followed. Firstly, the system is set in the reproduction mode. Then the remaining time indication $T_{X1}$ at the end of the second music piece or the beginning of the third music piece is read, the remaining time indication $T_{X2}$ at the end of the fifth music piece or the beginning of the sixth music piece is read, and the remaining time indication $T_{X2}$ is subtracted from the remaining time indication $T_{X1}$ (i.e., ($T_{X1}-T_{X2}$) is calculated) to obtain the play time from the beginning of the third piece of music to the end of the fifth piece of music. These complicated and troublesome steps pose the problem that a user is required to make the calculation by himself.

SUMMARY OF THE INVENTION

In view of the above problems of the prior art, the object of the present invention is to provide a signal recording and reproduction system in which the total time for playing a range of pieces of music, which total time the user wants to know, can be displayed without requiring the user to make his own calculation and with only a small number of operating steps being needed.

According to the present invention, there is provided a signal recording and reproduction system comprising section designating means for designating sections of continuously recorded signals, boundary registration means for registering a boundary between a first section and a second section both designated by the section designating means, time calculation means for calculating the total time necessary for the reproduction of recorded signals from the boundary point registered by the boundary registration means to the beginning of a section next to the second section designated by the section designating means, and total time calculation means for calculating the total time necessary for the reproduction of recorded signals from the beginning of the first section to the beginning of a section following a second section designated by the section designating means, and indication means for indicating the total time calculated by the time calculation means.

According to one aspect of the present invention, the time necessary for the reproduction of the desired reproduction range from the beginning of a first section of recorded signals designated by the section designating means is calculated by the total time calculation means, and the time thus calculated is displayed by the indication means, whereby the user can confirm the necessary reproduction time for a desired reproduction range simply by designating desired sections without making any calculations by himself.

According to another aspect of the present invention, the necessary reproduction time for a desired reproduction range set by the section designating means and the boundary registration means is calculated by the total time calculation means, and the time thus calculated is displayed by the indication means, whereby a user can confirm the necessary reproduction time simply by inputting the desired reproduction range without requiring any calculation to be made by himself.

BRIEF DESCRIPTION OF THE DRAWINGS

FIGS. 8A and 8B are diagrams showing an example of the content of a recording medium and an example of TOC data.

DESCRIPTION OF THE PREFERRED EMBODIMENTS

A signal recording and reproduction system according to an embodiment of the present invention will be explained below with reference to FIGS. 1 to 3.

Figure 1:
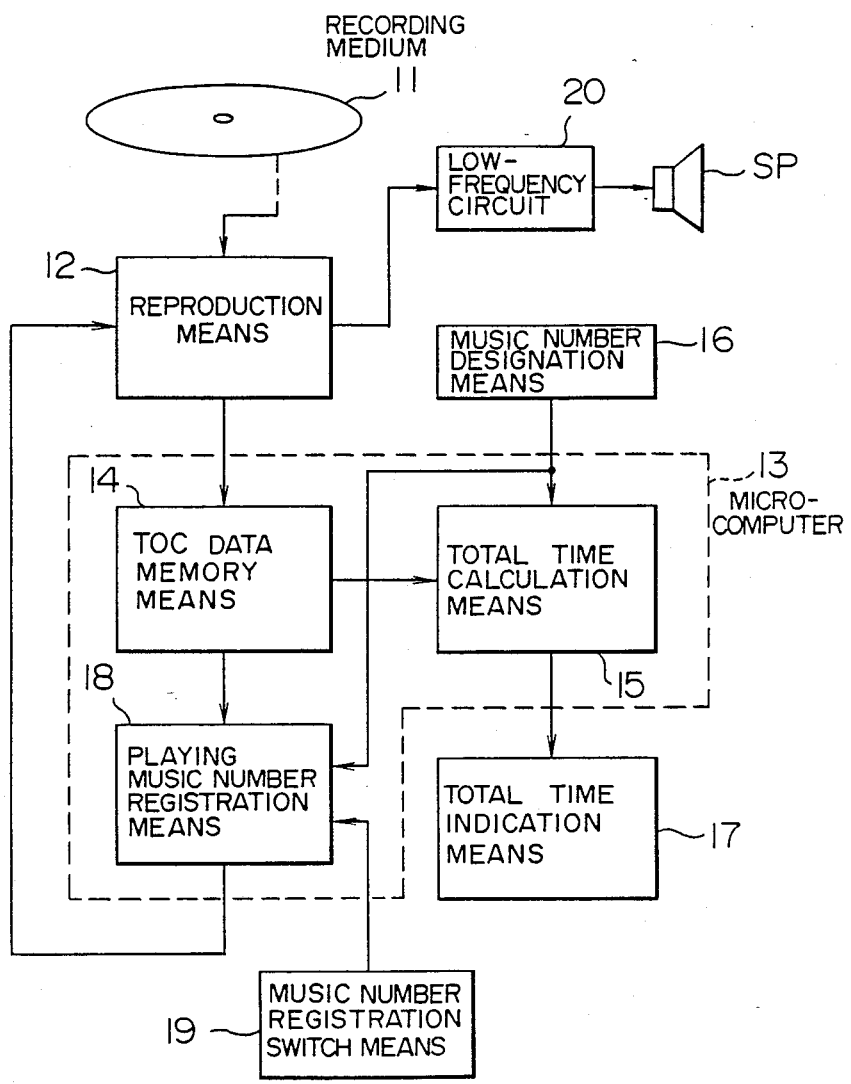
FIG. 1 is a block diagram showing a signal recording and reproduction system of a first embodiment of the present invention.

First, in the block diagram of FIG. 1, reference numeral 11 indicates a recording medium such as a compact disk, and numeral 12 indicates reproduction means for reproducing a signal recorded in the recording medium 1. Using the reproduction means 12, an audio signal recorded in the recording medium 11 is reproduced or played from a speaker SP via a low-frequency circuit 20, as the operation thereof is described later in detail.

Prior to the above-mentioned normal reproducing operation, firstly, the reproduction means 12 reproduces the TOC data recorded in the recording medium 11. The TOC data is described in the "Background of the Invention" section of this document. The TOC data read from recording medium 11 is stored in TOC data memory means 14 of a microcomputer 13 in the form of data as shown in FIGS. 8A and 8B. This data, once stored, is held in memory until the recording medium 11 is removed from the system. The stored data may be cancelled by detecting the operation of a switch or the like operatively interlinked with the opening and closing of a cover (not shown) at the time of loading and unloading the recording medium 11. Numeral 15 designates a total time calculation means disposed in the microcomputer 13 for computing the total time necessary for the reproduction of recorded signals, from the first piece of music to the start point of the piece of music following a designated piece of music, on the basis of a music number designated by the music number designation means 16 and a signal from the TOC data memory means 14. Numeral 17 denotes a total time indication means including an indicator such as a liquid crystal indicator and a drive circuit thereof for indicating the time data calculated by the total time calculation means 15.

Numeral 18 designates a playing music number registration means for registering a plurality of music numbers from the first music number to the music number designated by the music number designation means 16 which are read out from the TOC data memory means 14 in response to an input thereto supplied from music number registration switch means 19. When the music is played by the reproduction means 12, the pieces of music corresponding to the music numbers registered by the playing music number registration means 18 are reproduced sequentially from the speaker SP via the low-frequency circuit 20. The total reproduction time for the pieces corresponding to music of the registered music numbers coincides with the time indicated by the total time indication means 17.

Figure 2:
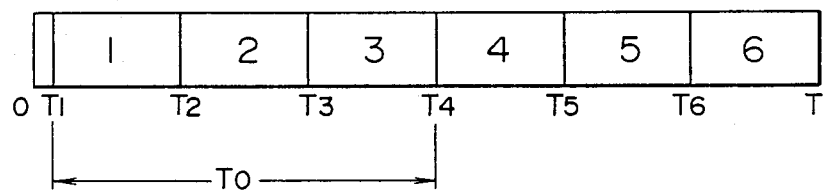
FIG. 2 is a diagram for explaining the operation of the same embodiment.

In this embodiment, assume that the time $T_0$ from the first piece of music to the end of the third piece of music is to be indicated as shown in FIG. 2, for instance, when using the recording medium 11 containing the TOC data as shown in FIG. 8. First, the third music number is designated by the music number designation means 16. Then, the total time calculation means 15 reads out the time data including the end point of the third piece of music, that is, start point $T_4$ of the fourth piece of music, and the start point $T_1$ of the first piece of music, from the TOC data memory means 14, and makes the calculating $T_0 = T_4 - T_1$. In this case, the resultant time length of 15'00" is indicated as the total time $T_0$ on the indicator of the total time indication means 17.

Figure 3:
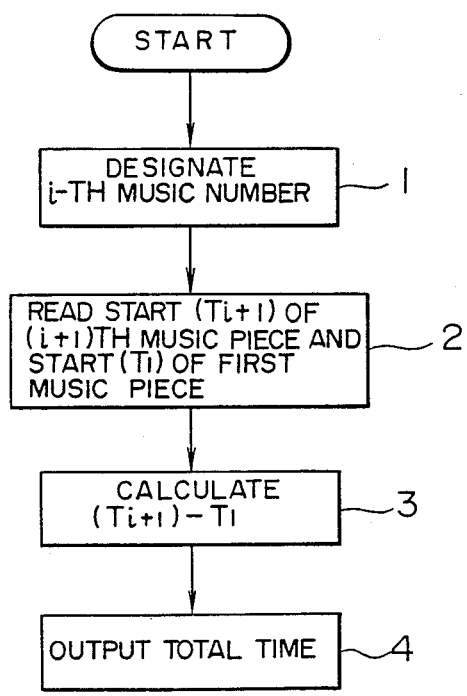
FIG. 3 is a flowchart of the operation of the same system.

FIG. 3 is a flowchart for explaining the processing steps for the operation of the above-described embodiment, which steps are performed by the microcomputer 13. Referring to FIG. 3, the processing steps to be executed after the TOC data in the recording medium 11 has been read and loaded in the system will not be explained. When the i-th music number is designated by the music number designation means 16, the designation of the associated music number i is inputted in step 1. In the next step, step 2, the start point $(T_{i+1})$ of the (i+1)th piece of music and the start point $T_1$ of the first piece of music are read out from the TOC data memory means 14. In the next step, step 3, the value of $(T_{i+1}) - T_1$ is calculated to find the total time $T_0$, and then in step 4, the total time $T_0$ is outputted to the total time indication means 17.

In the above embodiment, an explanation has been presented for the case in which the pieces of music to be played are recorded in a recording medium as a recording signal. However, the same processings may also be applied to a data signal or the like to be recorded in another recording means, such as a magnetic disk file. In this case, the plurality of pieces of music are replaced by signals recorded in a plurality of sections, and a section designation means corresponding to the music number designation means 16 is used.

Figure 4:
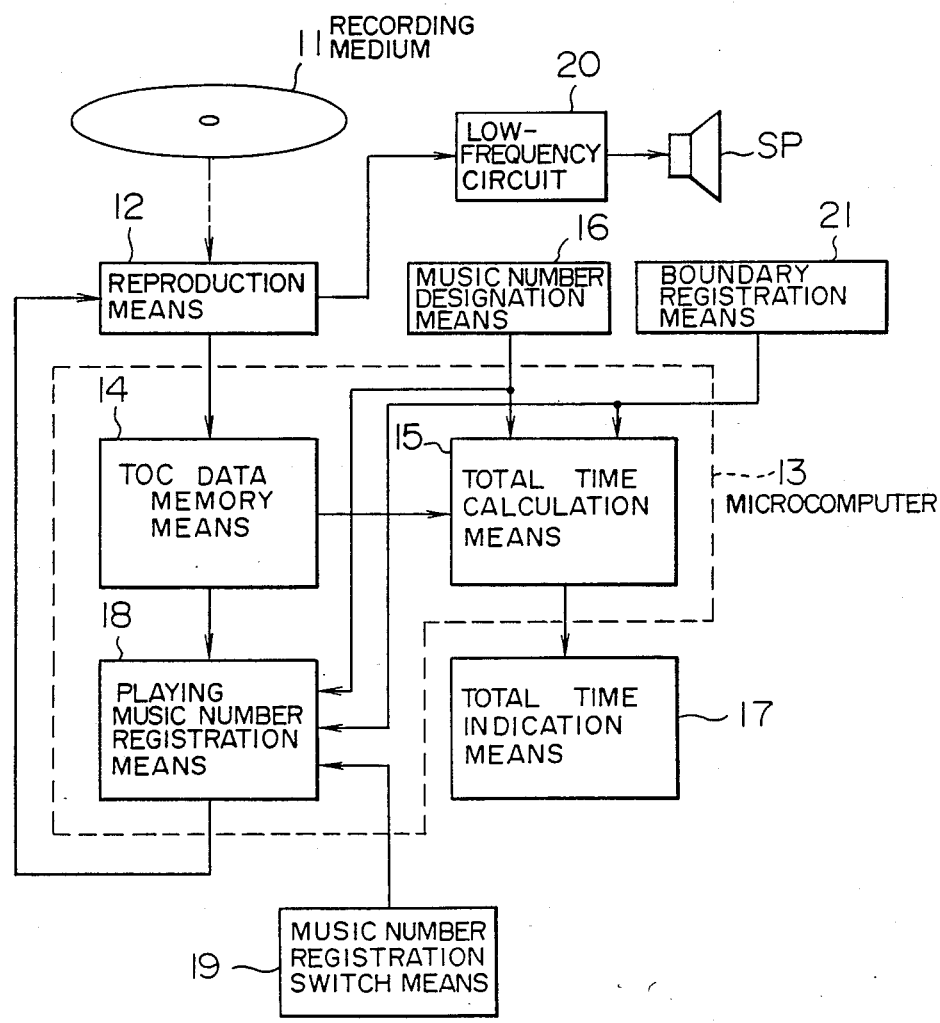
FIG. 4 is a block diagram showing a signal recording and reproduction system of a second embodiment of the present invention.
Figure 5:
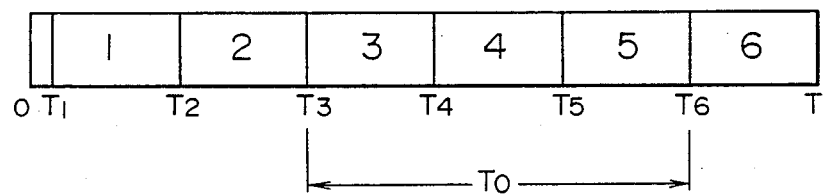
FIG. 5 is a diagram for explaining the operation of the same system.
Figure 6:
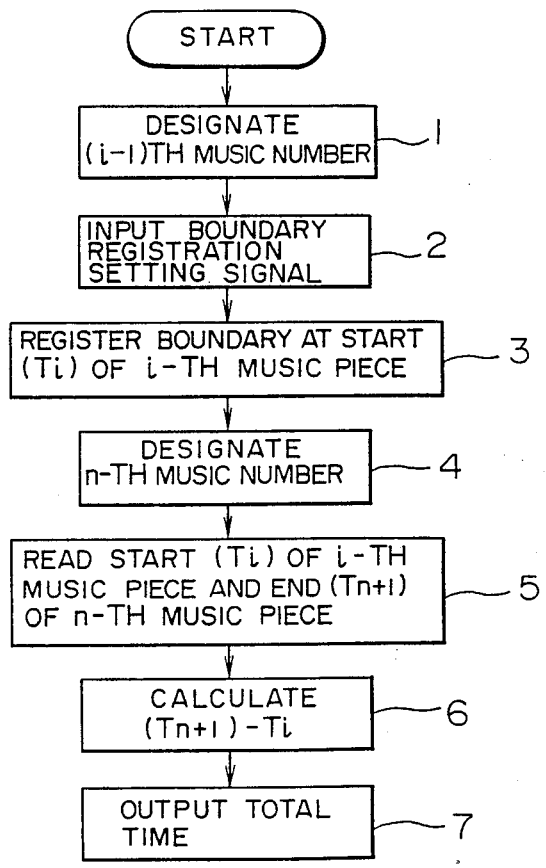
FIG. 6 is a flowchart of the operation of the same system.

FIGS. 4 to 6 show a signal recording and reproduction system of a second embodiment of the present invention. This embodiment is different from the first embodiment in that this embodiment is provided with boundary registration means 21. In this second embodiment, prior to a normal reproducing operation, firstly, the reproduction means 12 reproduces the TOC data recorded in the recording medium 11 and stores it in the TOC data memory means 14 of a microcomputer 13. This TOC data memory means 14 stores data such as that shown in FIG. 8. Once the data is stored, it is kept memorized until the recording medium 11 is removed from the system. The cancellation of the stored data is effected by detecting the operation of a switch or the like operatively interlinked with the opening and closing of a cover (not shown) at the time of loading or unloading the recording medium 11. Numeral 15 designates a total time calculation means disposed in the microcomputer 13. The total time calculation means 15 computes the total time covering the desired pieces of music on the basis of the music number data for a desired range of sections set by the music number designation means 16 and the boundary registration means 21, and also on the basis of a signal from the TOC data memory means 14. Numeral 17 designates a total time indication means, including an indicator such as a liquid crystal indicator and a drive circuit thereof, for indicating the time data calculated by the total time calculation means 15. In setting a desired boundary between two pieces of music, firstly, the music number designation means 16 designates a music number immediately preceding the first music number in the desired section range. Then, by operating the boundary registration means 21, which is composed of a switch or the like, a boundary between two pieces of music is registered in the microcomputer 13. Subsequently, the music number designation means 16 designates the last music number in the desired section range. In accordance with both designations mentioned above, the total time calculation means 15 calculates the total time necessary for reproducing the pieces of music included in the desired section range.

Numeral 18 designates a playing music number registration means. The playing music number registration means 18 operates to read out a plurality of music numbers included in the desired section range, which has been set by the music number designation means 16 and the boundary registration means 21 in response to a signal supplied from the music number registration switch means 19, from the TOC data memory means 14, and then to register the read-out music numbers. At the time of normal reproduction by the reproduction means 12, the pieces of music corresponding to the music numbers registered by the playing music number registration means 18 are sequentially reproduced from the speaker SP via the low-frequency circuit 20. The total reproduction time for the pieces of music corresponding to the registered music numbers is indicated by the total time indication means 17.

In this embodiment, in order to indicate the time $T_0$ from the third piece of music to the end of the fifth piece of music as shown in FIG. 5, for example, when using a recording medium 11 containing the TOC data as shown in FIG. 8, firstly, the second music number is designated by the music number designation means 16. Then, by operating the boundary registration means 21, a boundary is registered at the time point $T_3$ between the second and third pieces of music. After that, if the fifth music number is designated by the music number designation means 16, the section range from the start time point $T_3$ of the third piece of music to the end time point $T_6$ of the fifth piece of music on the recording medium 11 is set. Thus, the total time calculation means 15 reads out the time data with respect to the time points of $T_3$ and $T_6$ from the TOC data memory means 14 and performs the calculation $T_0=T_6-T_3$. In this case, the resultant time length of 15'00" is indicated as the total time $T_0$ by the total time indication means 17.

FIG. 6 is a flowchart for explaining the processing steps performed by microcomputer 13, for the operation of the above-described embodiment. FIG. 6 illustrates the steps after the recording medium 11 has been loaded in the system and the TOC data has been stored. Firstly, in step 1, the music number designation means 16 designates and inputs the (i−1)th music number immediately preceding the (i-th) music number (a first music number) in the desired section range. In the next step 2, a setting signal for the boundary registration means 21 is inputted. Then, in step 3, the boundary between the (i−1)th and i-th pieces of music, that is, the start point $T_i$ of the i-th piece of music, is registered. In step 4, the music number designation means 16 designates and inputs again the n-th music number (the last music number) in the desired section range. Step 5 reads out the data relating to the start point $(T_i)$ of the i-th piece of music and the end point $(T_{n+1})$ of the n-th piece of music. In step 6, the total time calculation means 15 performs the calculation of $(T_{n+1})-T_i$. Then, step 7 outputs the total time $T_0$.

In the aforementioned embodiments, an explanation has been presented for the case in which pieces of music to be played as an audio signal are recorded in a recording medium as a recording signal. However, the same processings may be applied to a data signal or the like to be recorded in a magnetic disk file or the like. In this case, the plurality of pieces of music are replaced by signals recorded in a plurality of sections, and a section designation means 16' is used as a device corresponding to the music number designation means 16.

Figure 7:
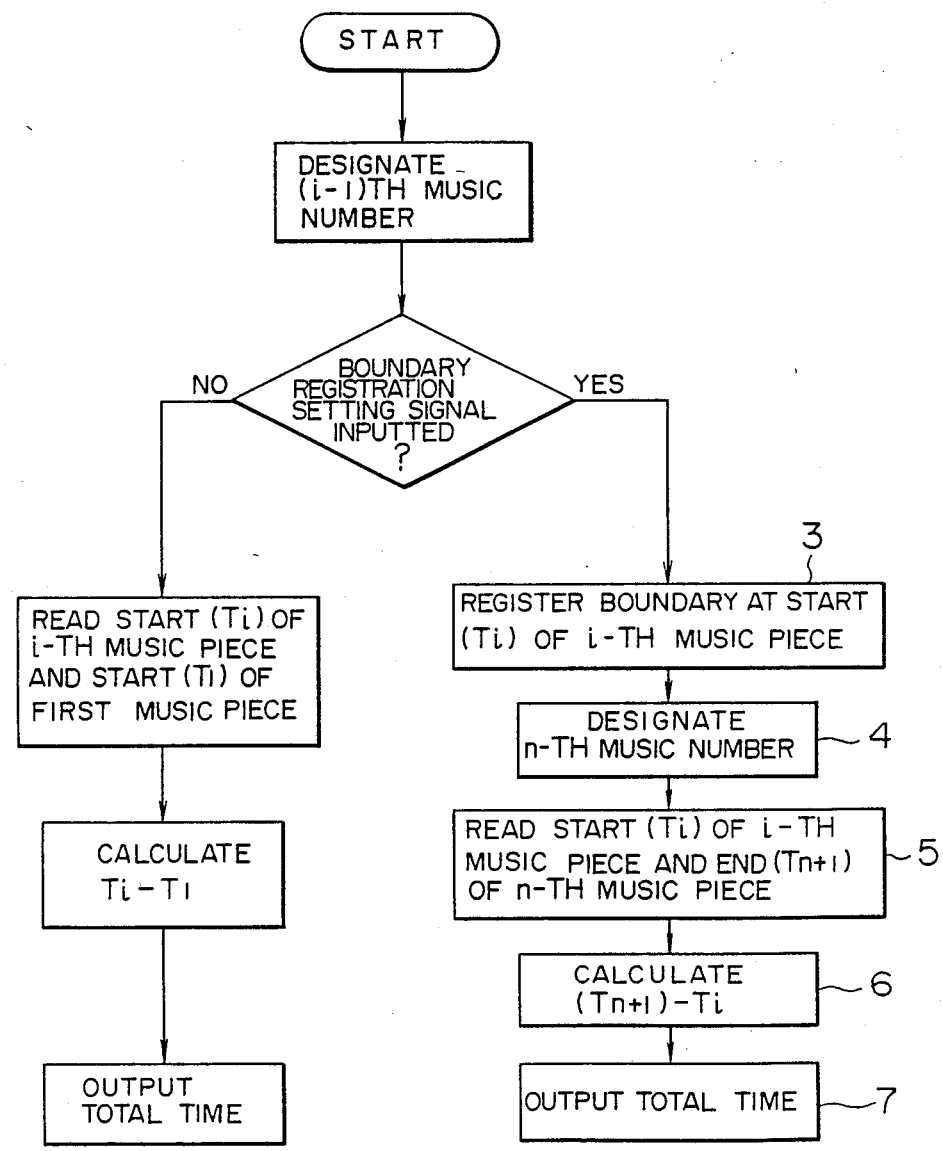
FIG. 7 is a flowchart of the operation of a modification of the system.
Figure 9:
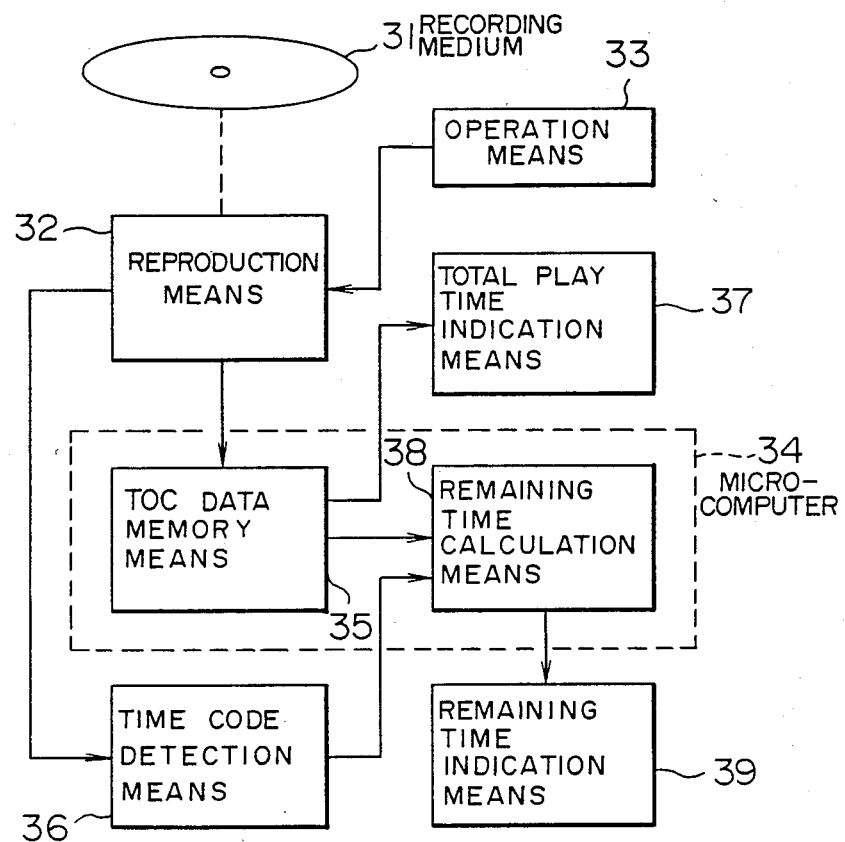
FIG. 9 is a block diagram showing a conventional system.
Figure 10:
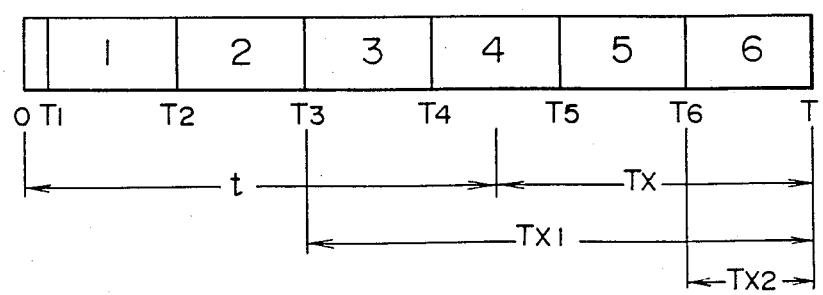
FIG. 10 is a diagram for explaining the operation of the same system.

Incidentally, as shown in FIG. 7, following the section designation by the section designation means 16', an additional decision step may be provided to decide whether or not a setting signal has been inputted by the boundary registration means 21. If this additional decision step for deciding the presence or absence of a boundary registration setting input decides that there has been no boundary registration setting input, the processing proceeds to the left branch. In the processings contained in the left branch, the total time from the first piece of music to a second piece of music, whose number was designated in the first step, is calculated on the basis of the start data $T_1$ of the first piece of music and the start data $T_i$ of the i-th piece of music immediately following the (i−1)th piece of music designated by the section designation means 16', and the calculated total time is outputted. If the decision step for deciding the presence or absence of a boundary registration setting input decides that there is a boundary registration setting input, on the other hand, the processing proceeds to the right branch. In the processings contained in the right branch, the total time from the boundary time point $T_i$ thus set to the end of the second section n designated by the section designation means 16', namely, the start point $(T_{n+1})$ of the section n+1 immediately following the second section n, is calculated and outputted.

What we claim is:

1. A signal recording and reproducing system for a recording disk having information continuously recorded thereon in a plurality of sections, and having recorded thereon TOC data including a respective start point for each of the plurality of sections, each start point representing a length of time from the origin of the recording disk, said system comprising:

TOC data memory means for storing the TOC data after reproduction thereof from said recording disk;

section designating means for designating one of said plurality of sections, which corresponds to an ending section of a desired reproduction section range when said desired reproduction begins with the first section of said plurality of information sections;

means for reading from said TOC data memory means a start time representing the start point $(T_i+1)$ of a section immediately following the ending section designated by said section designating means and for reading a start time representing the start point $(T_1)$ of the first section of said plurality of sections;

time calculation means for calculating the total time required for reproducing said desired reproduction section range by subtracting the start point $(T_1)$ of the first section from the start point $(T_i+1)$ of the section immediately following the ending section of said desired reproduction section range; and total time indication means for indicating the total time calculated by said time calculation means.

2. A signal recording and reproducing system for a recording disk having information continuously recorded thereon in a plurality of sections, and having recorded thereon TOC data including a respective start point for each of the plurality of sections, each start point representing a length of time from the origin of the recording disk, said system comprising:

TOC data memory means for storing the TOC data after reproduction thereof from said recording disk;

section designating means for designating a section $(i-1)$ immediately preceding the beginning section (i) of a desired reproduction section range and for designating an ending sectin (n) of said desired reproduction section range;

boundary registration means for registering a boundary between the section $(i-1)$ designated by said section designating means and the beginning section (i) of said desired reproduction section range;

means for reading from said TOC data memory means a start time representing the start point $(T_i)$ of the beginning section (i) immediately following the section $(i-1)$ designated by said section designating means and for reading a start time representing the start point $(T_n+1)$ of the section immediately following the ending section (n) designated by said section designating means;

time calculation means for calculating the total time required for reproducing the desired reproduction section range by subtracting the start point $(T_i)$ of the beginning section (i) from the start point $(T_n+1)$ of the section immediately following the ending section (n) of the desired reproduction section range; and total time indication means for indicating the total time calculated by said time calculation means.

3. A signal recording and reproducing system according to claim 2, further comprising:

decision means for deciding whether the boundary between the designated section $(i-1)$ and the beginning section (i) has been registered or not;

wherein, said time calculation means calculates, if said decision means decides that a boundary has not been registered, the total time required for reproducing the information from the start point of the first section of said plurality of sections to the start point of the beginning section (i) of the desired reproduction section range, whereas, if said decision means decides that the boundary has been registered, said calculation means calculates the total time required for reproducing the desired reproduction section range from the start point $(T_i)$ of the beginning section (i) to the start point $(T_n+1)$ of the section immediately following the ending section (n) of the desired reproduction section range.

* * * * *